United States Patent [19]

Ohtorii

[11] Patent Number: 4,771,336

[45] Date of Patent: Sep. 13, 1988

[54] DEVICE FOR SETTING TRIMMING AREAS OF AN ORIGINAL

[75] Inventor: Masakazu Ohtorii, Hikone, Japan

[73] Assignee: Dainippon Screen Mfg. Co., Ltd., Japan

[21] Appl. No.: 119,163

[22] Filed: Nov. 10, 1987

[30] Foreign Application Priority Data

Nov. 11, 1986 [JP] Japan .............................. 61-172008[U]

[51] Int. Cl.$^4$ ............................................. H04M 1/04
[52] U.S. Cl. ..................................... 358/285; 358/293; 358/294
[58] Field of Search ............... 358/280, 282, 285, 293, 358/294; 355/14 CU, 14 SH

[56] References Cited

U.S. PATENT DOCUMENTS

| 4,554,592 | 11/1988 | Yoshida | 358/293 |
| 4,616,269 | 10/1986 | Mori | 358/280 |
| 4,630,127 | 12/1986 | Fuwa | 358/285 |
| 4,631,599 | 12/1986 | Cawkell | 358/280 |
| 4,673,989 | 6/1987 | Yamada et al. | 358/293 |
| 4,727,431 | 2/1988 | Nakamura et al. | 358/285 |

FOREIGN PATENT DOCUMENTS 61-148047 12/1986 Japan .

Primary Examiner—Edward L. Coles, Sr.
Attorney, Agent, or Firm—Ostrolenk, Faber, Gerb & Soffen

[57] ABSTRACT

In a device for setting trimming areas of an original in an original image reproduction apparatus of a flat bed scanning type wherein the original is pressed on a transparent plate by a surface of a frame pivotably supported by a bearing mechanism on a side of the transparent plate when the frame is closed relative to the transparent plate and image signals for recording reproduced images of the trimming areas of the original are obtained by photoelectrically scanning the original through the transparent plate by means of a CCD linear sensor array, the improvement includes a digitizer board provided on the pressing surface of the frame for obtaining coordinate values defining predetermined points at the desired trimming areas of the original mounted on the board.

1 Claim, 2 Drawing Sheets

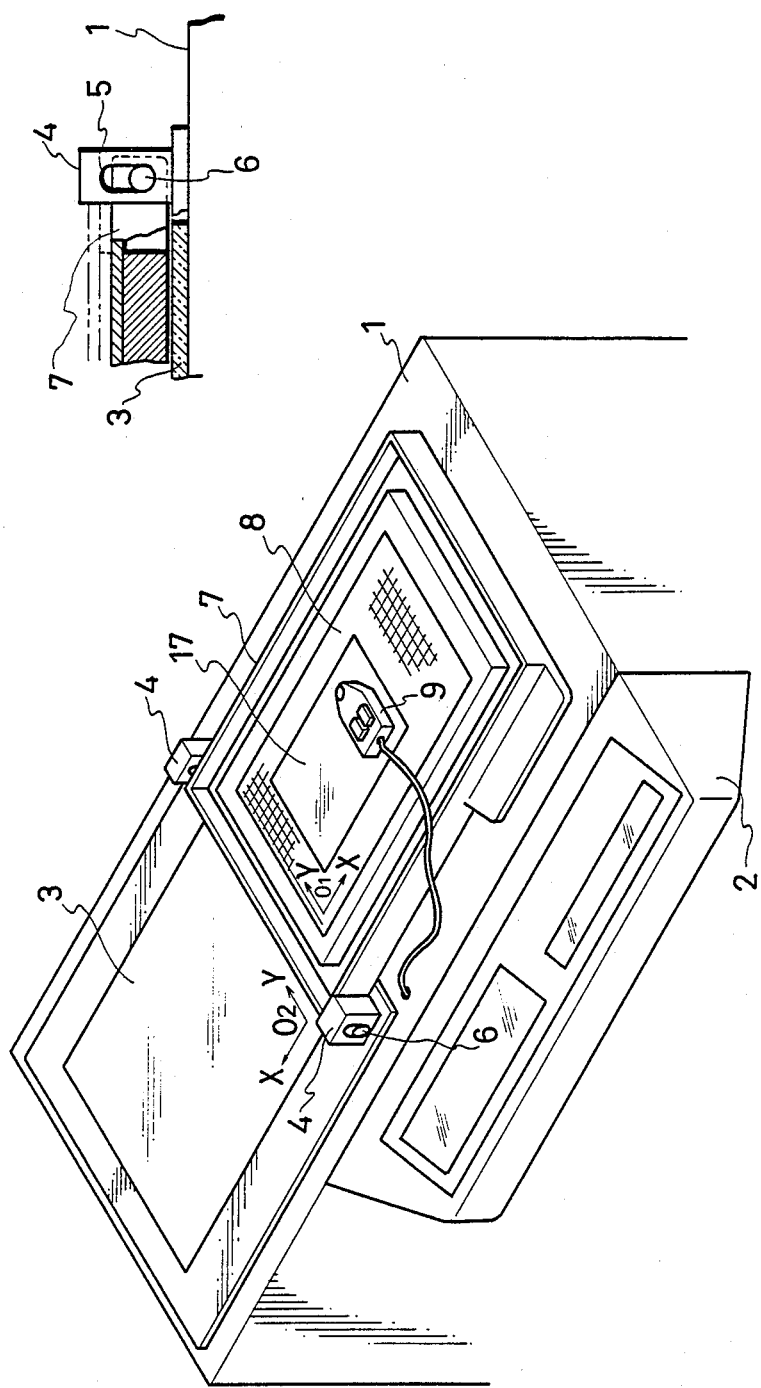

DEVICE FOR SETTING TRIMMING AREAS OF AN ORIGINAL

FIELD OF THE INVENTION AND RELATED ART STATEMENT

BACKGROUND OF THE INVENTION

The present invention generally relates to an original image reproduction apparatus such as a flat bed scanning type which obtains image information concerning an original to be reproduced by photoelectrically scanning the original which is sandwiched between a transparent plate member and a pressing member and records a reproduced image of the original on the basis of the scanned information, and more particularly to a device, which is integrally provided in the original image reproduction apparatus, for accurately measuring areas of the original to be selectively reproduced of the original (hereinafter referred to as "trimming" areas) and inputting trimming data on the areas to a control circuit which delivers to a recording unit in the apparatus signals for reproducing the trimming areas only. Heretofore, most of the above trimming area setting devices which have been applied to flat bed scanning type original image reproduction apparatus have been separate from the body of the apparatus. In one such example, the original to be reproduced is positioned on a digitizer board and every time a measuring head is sequentially moved to a predetermined number of points on desired trimming areas of the original, the head is actuated to input coordinate data on the points to the control circuit in the apparatus.

The above type of the trimming area setting device inevitably requires installation space in addition to that of the body of the apparatus because of its separation from the body of the apparatus This increases the cost of installation. Furthermore, it is necessary to ensure that the coordinates which define the desired trimming areas of the original located on the body of the apparatus and the coordinates on the setting device are in cooorespondence with each other and also to have the original-mounting positions coincide with one another, to accurately measure the trimming areas and to input required trimming data to the control circuit provided in the body of the apparatus. Although this is possible to do, it is a difficult task and accordingly the installation cost is increased. Moreover, in operation every original to be reproduced needs to be covered from the device to the body of the apparatus which adversely effects the accuracy of the alignment.

Japanese utility model application Kokai No.61-148047 discloses another type of the trimming area setting device that includes an original pressing plate member having an upper (or back) surface on which a digitizer board is provided for setting the trimming areas of the original thereon. However, it is necessary to so remount onto the transparent plate member every original which has undergone the trimming area setting procedure on the digitizer board so as to ensure that the location of the original on the transparent plate member coincides with that on the board after the pressing plate member is opened relative to the transparent plate member, which naturally leads to poor workability. Where the original being treated is substantially thin, the original properly mounted on the transparent plate may be dislocated by wind produced by closing of the pressing plate relative to the transparent plate so as to superpose it on the transparent plate.

SUMMARY OF THE INVENTION

With a view to solving the aforementioned problems, it is an objective of the present invention to provide a novel and improved device for setting trimming areas of an original in an original image reproduction apparatus.

It is another objective of the invention to provide a device for setting trimming areas of an original in an original image reproduction apparatus according to which it is possible to quickly and accurately measure the desired trimming areas of the original and to apply to a control circuit in the apparatus trimming data for reproducing the trimming areas of the original.

To accomplish the above objectives, the invention provides a device for setting trimming areas of an original in an original image reproduction apparatus of a flat bed scanning type, which apparatus obtains image information on the original to be reproduced by photoelectrically scanning the original by means of photoelectrically scanning means and records a reproduced image of said original on the basis of said information, the device comprises: a transparent member provided on upper surface of a body of the apparatus for mounting thereon the apparatus, so as to photoelectrically scan the original through the transparent member; a pivotable member pivotably mounted on one side of said transparent member so as to be opened and closed relative to the transparent member and having surface for pressing the original mounted on the transparent member when the pivotable member is closed relative to the transparent member; and digitizer means provided on the pressing surface of the pivotable member for obtaining coordinate trimmming data on the trimming areas of the original.

According to the invention, since the digitizer means is provided on the pressing surface of the pivotable member per se, it is possible to quickly set the accurate trimming area data. Furthermore it is not necessary to dismount the original from the digitizer means and mount it on the transparent member after setting the trimming areas of the original is completed. It is also not required to provide respective original positioning means on the body of the apparatus and the digitizer means to attain the accurate trimming area setting.

BRIEF DESCRIPTION OF THE DRAWINGS

The foregoing and the other objectives and attendant advantages of the present invention will be readily appreciated as the same becomes better understood by reference to the following detailed description when considered by the accompanying drawings, wherein:

FIG. 1 is a perspective view illustrating an embodiment of the device according to the invention;

FIG. 2 is a partially enlarged sectional view depicting a bearing mechanism in the device of FIG. 1 at the time a frame is closed relative to a transparent plate;

DETAILED DESCRIPTION OF THE PREFERRED EMBODIMENTS

Figure 3:
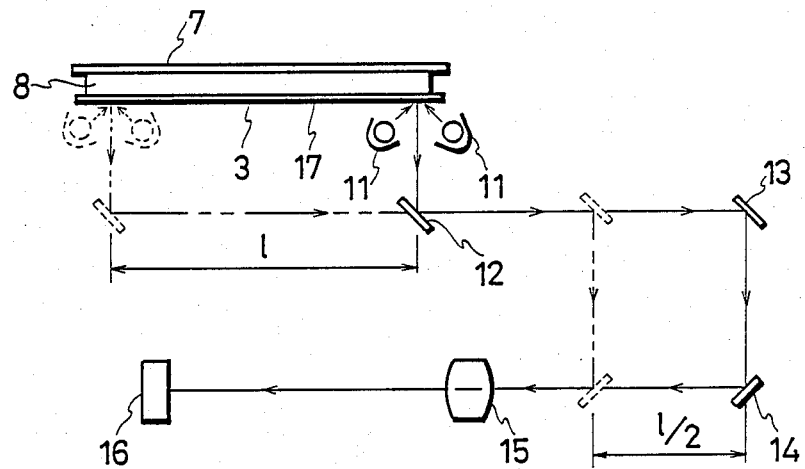
FIG. 3 is a schematic view showing a scanning original illumination optical system of the device of FIG. 1.

Now referring to the drawings, there are described below preferred embodiments of the invention.

FIG. 1 is a perspective view illustrating an embodiment of the device according to the invention and FIG. 2 is a partially enlarged sectional view depicting a bearing mechanism in the device of FIG. 1 at the time that a frame 7 is closed relative to a transparent plate 3.

On the front surface of a body 1 there is provided an operation panel 2, while on the left upper surface of the body 1 there is provided the transparent plate 3 made, for example, of glass etc. On the right edge of the plate 3 there are provided a pair of beaings 4 and a shaft 6. A frame 7 (upon which an original 17 may be mounted) is pivotably supported by the bearings 4 and the shaft 6, and is opened (as shown in FIG. 1) and closed relative to the glass plate 3 after pivoted through an angle of 180 degrees. Each of the bearings 4 is formed with a vertically extending slot 5 (FIG. 2), into which both ends of the shaft 6 are inserted. Thus the shaft 6 can be somewhat vertically dislocated, so that uniform pressure is applied to the original 17 when the frame 7 is closed as mentioned above and the original 17 is sandwiched between the glass plate 3 and the frame 7.

That surface of the frame 7 which has contact with the glass plate 3 constitutes such a digitizer board 8 (well known in the art) which has wirings formed in lattice at a predetermined pitch on the lower surface of a board member for defining X and Y coordinates. After a measuring head 9 is moved to a desired position on the board 8 and an input switch of the head 9 is actuated, coordinate values of X- and Y-axes with respect to the origin $0_1$ at the position are applied to a control circuit (not shown) provided in the body of the apparatus.

In mounting the original 17 on the board 8, it is necessary to secure the original 17 thereon in order to prevent the original 17 from shifting from its initial position on the board 8 when the frame 7 is pivoted on the shaft 6 toward the plate 3 until the frame 7 is closed relative to the plate 3. Accordingly, for example, the original 17 is hold on the board 8 by means of an adhesive tape, or a commercially available digitizer board of an electrostatic suction type is employed which fixes thereon such materials as a film, paper, and the like by application of static electricity.

As with most digitizers, coordinate information is inputted by moving the measuring head 9 is moved to sequential points on the original 17 to define a desired trimmig area, the respective coordinate values with respect to the origin $0_1$ at the points are inputted to the control circuit.

FIG. 3 is a schematic view showing an original illumination optical system of the device of FIG. 1. There is disposed the original illumination optical system forming part of an input scanning unit is located beneath the transparent plate 3 and is arranged in conventional manner. The original (illumination optical system is incorporated in the original image reproduction apparatus of the flat bed scanning type, for photoelectrically scanning the original 17 pressed on the plate 3 by the frame 7 in a linear manner. The optical system includes a linear light source 11 extending in a direction perpendicular to the plane of the drawing and designed to travel a predetermined distance l along the lower surface of the plate 3, a mirror 12 horizontally reflecting light flux from the original 17 and adapted to move the same distance l synchronously with the system 11, a set of mirrors 13 and 14 reflecting the light flux from the mirror 12 and designed to travel half the distance l at half the speed of the mirror 12 in a direction parallel to the direction in which the mirror 12 is moved, and a focusing lens 15.

The light source 11 illuminates the original 17 through the transparent plate 3 and the focused linear image thereof is projected by the focusing lens 15 through the lenses 12, 13, and 14 onto a photoelectric transducer 16 which includes a number of linear or one-dimentional photoelectric transducer elements arrayed in a row such as a CCD (charge coupled device) linear sensor array. The respective transducer elements respond to light from the optical system and produce electric signals depending on the density of corresponding picture elements of the original 17.

In linear scanning of the original 17, the light source 11 and the mirror 12 travel from the positions indicated in solid-lines to those depicted in phantom in FIG. 3 along the original 17, and simultaneously the mirrors 13 and 14 are moved in the same direction at half the speed of the source 11 and the mirror 12. Thus, it is possible to maintain the length of optical path from the illuminated surface of the original 17 to the lens 15 constant, with the result that the image of the original 17 can always be focused onto the surface of the transducer 16 at a constant magnification ratio.

The coordinates of the digitizer board 8 and of the photoelectrical scanning at the transparent plate 3 by the input scanning unit are arranged to correspond to each other, i.e. the origin $0_1$ of the X- and Y-axes in the digitizer board 8 is designed to conincide with original linear scanning coordinate origin $0_2$ at the transparent plate 3 by the input scanning unit when the frame 7 is completely closed relative to the plate 3. Accordingly main scanning direction of the unit corresponds to the Y-axis, while sub-scanning direction thereof the X-axis.

Furthermore, there is provided an encoder device (not illustrated) for producing signal pulses in accordance with running distances of the light source 11 and the mirror 12. The running distance of the source 11 and mirror 12 corresponds to the X-axis in the board 8, and accordingly the number of the so produced signal pulses corresponds the coordinate value at the X-axis in the digitizer board 8, whereas the row in which the respective transducer elements making up the photoelectric transducer 16 are arranged corresponds to Y-axis in the board 8. The input scanning unit including the original illumination optical system illustrated in FIG. 3 is the one which is conventionally applied to the original image reproduction apparatus of the flat bed scanning type utilizing the linear or one-dimentional photoelectric transducer such as the CCD linear sensor array, as mentioned in the foregoing.

Figure 4:
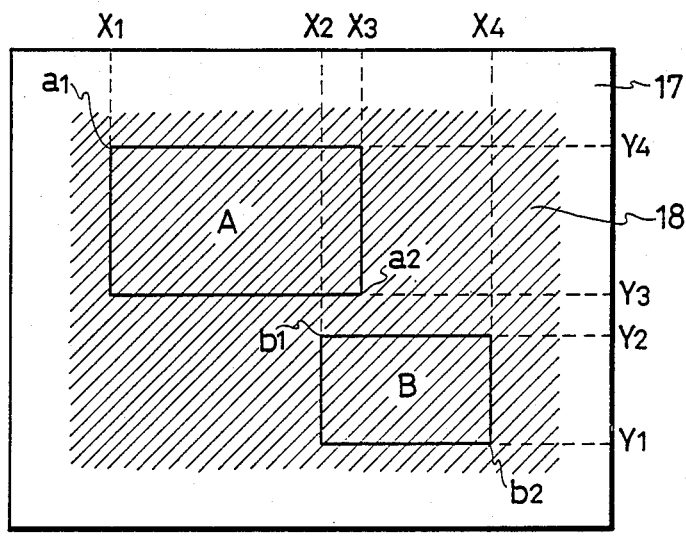
FIG. 4 is a view illustrating an example of setting trimming areas of an original.

By way of example, the manner in which an original 17 (which includes a picture 18 denoted in oblique lines in the original 17 in FIG. 4) is trimmed at rectangular areas A and B is described below. Initially, the frame 7 is opened relative to the transparent plate 3 as illustrated in FIG. 1. Then the original 17 is fixed on the digitizer board 8 by means of the adhesive tape or by application of electrostatic suction, so that the areas A and B are defined by coordinate values $X_1: Y_4; X_3: Y_4; X_3: Y_3; X_1: Y_3;$ and $X_2: Y_2;$ by coordinate values $X_1: Y_4; X_3: Y_4; X_3: Y_3; X_1: Y_3;$ and $X_2: Y_2; X_4: Y_2; X_4: Y_1; X_2: Y_1$ in the X- and Y-axes of the digitizer board 8 with respect to the origin $0_1$, respectively.

Thereafter, according to the conventionally known coordinate data inputting operation of a rectangular object by means of the digitizer, coordinate values representing two diagonal points on each of the rectangles A and B are applied to the control circuit in the body of the apparatus. With references to the area A, the measuring head 9 is first moved and positioned at point $a_1$ on the original 17 that is represented by the coordinate values $X_1$ and $Y_4$, and then the head 9 is actuated to input the coordinate values $X_1$ and $Y_4$ to the control circuit. Next, after the head 9 is moved to point $a_2$ on the original 17 defined by the coordinate values $X_3$ and $Y_3$, these two values are similarly inputted to the control circuit. Thereafter, the coordinate values $X_2:Y_2$; $X_4:Y_1$ that represent points $b_1$ and $b_2$ respectively are inputted to the control circuit with respect to the area B in the same manner as in the area A.

Subsequently, the frame 7 is pivoted through an angle of 180 degrees and closed relative to the transparent plate 3 with the original 17 secured on the digitizer board 8, and then the original 17 is scanned by the input scanning unit. While the light souce 11 and the mirror 12 travel beneath and along the original 17 as illustrated in FIG. 3 in scanning the original 17, the control circuit selectively delivers, based on the inputted trimming data on the original 17, to an output recording unit (not depicted) of the original image reproduction apparatus, output signals from those respective photoelectric transducer elements of the transducer 16 that correspond to part of the Y-axis delimited by the coordinated values $Y_3$ and $Y_4$ in regard to a traveling distance in the X-axis direction which is defined by the coordinate values $X_1$ and $X_3$. In regard to a running distance delimited by the coordinate values $X_2$ and $X_4$, the control circuit also selectively transmits to the recording unit output signals from those respective transducer elements which correspond to part of the Y-axis specified by the coordinate values $Y_1$ and $Y_2$. Thus, it is possible to reproduce and record the images of the disired trimming areas A and B of the original 17. In this connection, the term "record" is interpreted to comprehend provisionally writing image signals obtained by the above scanning into a memory device such as a magnetic disc throughout this specification.

Since the coordinate origin $0_1$ of the digitizer board 8 is arranged to coincide with the scanning coordinate origin $0_2$ at the transparent plate 3 when the frame 7 is closed relative to the plate 3 as mentioned above, the data per se on the trimming areas of the original 17 which have been obtained with respect to the coordinates of the board 8 can be applied as information for choosing output signals produced by the respective photoelectric transducer elements.

Although in the above embodiment, the device according to the present invention is applied to the flat bed scanning type original image reproduction apparatus which linear scans the original by illuminating the original by means of the linear light source, needlles to say, the device can also be applied to other original image reproduction apparatuses of the same type, for example to the apparatus adapted to flying-spot scans the original to be reproduced by polarizing the light beam toward the original.

Furthermore, although the frame 7 is opened relative to and aside of the transparent plate 3 in the above embodiment, it is possible to so modify the device that the frame 7 is opened and closed relative to and on the rear side of the transparent plate 3.

While the preferred embodiments of the present invention have been described above, it should be understood that various modifications may be made herein without departing the spirit of the invention and scope of the appended claims.

What is claimed is:

1. A device for setting trimming areas of an original in an original image reproduction apparatus of a first bed scanning type, which apparatus obtains image information on said original by photoelectrically scanning said original utilizing photoelectrically scanning means to obtain scanned information and records a reproduced image of said original on the basis of said scanned information, said device comprising;

a transparent member adapted to have an original provided thereon for supporting an original to be photoelectrically scanned by said photoelectrically scanning means;

a pivotable member pivotably located on one side of said transparent member and moveable between opened and closed positions relative to said transparent member, said pivotable member having a pressure surface for pressing said original mounted against said transparent member when said pivotable member is in said closed position; and digitizer means provided on said pressing surface of said pivotable member for obtaining coordinate trimming data concerning said trimming areas of said original.

* * * * *